United States Patent
Su

(10) Patent No.: US 7,192,292 B1
(45) Date of Patent: Mar. 20, 2007

(54) CARD CONNECTOR HAVING IMPROVED SUPPORTING STRUCTURE FOR EJECTING MECHANISM

(75) Inventor: Yu-Hung Su, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/367,993

(22) Filed: Mar. 3, 2006

(51) Int. Cl.
*H01R 13/62* (2006.01)

(52) U.S. Cl. ...................................................... 439/159
(58) Field of Classification Search .................. 439/159
See application file for complete search history.

(56) References Cited

U.S. PATENT DOCUMENTS

| | | | |
|---|---|---|---|
| 6,394,827 B2 * | 5/2002 | Nogami | 439/159 |
| 6,655,972 B2 * | 12/2003 | Sato | 439/159 |
| 6,746,256 B1 * | 6/2004 | Wang | 439/159 |
| 2002/0052132 A1 | 5/2002 | Sato | |

* cited by examiner

*Primary Examiner*—Truc Nguyen

(57) ABSTRACT

A card connector includes: an insulating housing having a base, a back wall extending upward form a rear end of the base, a partition wall formed with a first stopper, and a second stopper extending upward from a front portion of the base; a plurality of terminals disposed on the base; a shield covering the insulating housing to define a card receiving space for receiving a card; and an ejecting mechanism slidable in the card receiving space for inserting/ejecting the card. The ejecting mechanism includes a slider and a compressed spring disposed between the back wall and the slider for pushing the slider to slide. The slider is formed with a first receiving board, and a blocking portion with a second receiving board extending out. The slider slides between a first position and a second position where the blocking portion of the slider leans against the second stopper and the two receiving boards wedge in the two recesses defined below the two stoppers.

6 Claims, 6 Drawing Sheets

CARD CONNECTOR HAVING IMPROVED SUPPORTING STRUCTURE FOR EJECTING MECHANISM

BACKGROUND OF THE INVENTION

1. Field of the Invention

The present invention relates to a card connector, and more particularly to a card connector having improved supporting structure for ejecting mechanism.

2. The Related Art

In electronic devices such as mobile phones, PDAS (personal digital assistants) and cameras, a variety of functions are added by inserting a card with a built-in CPU or memory IC such as a SIM (subscriber identity module) card, an MMC (multimedia card), an SD (secure digital) card, and so on. To allow a removable insertion of the card, a card connector having a plurality of terminals is provided. The terminals are brought into contact with a plurality of contact pads formed on a surface of the card to electrically connect the card to the electronic device on which the card connector is mounted.

Many of such card connector is provided with an ejecting mechanism for removing the inserted card from the card connector.

U.S. Pat. Pub. No. U.S. 2002/0052132 describes a push type card connector with a heart-shaped cam. The connector comprises of an insulating housing, a shield covering the insulating housing, a plurality of terminals and an ejecting mechanism.

The ejecting mechanism comprises a spring, a slider, a heart-shaped groove and a cam lever. The spring is disposed between the insulating housing and the slider. The slider is slidably arranged on one side of the insulating housing. The heart-shaped groove is formed as an integral part of the insulating housing. One end of the cam lever is connected to the slider, while the other end is movable along the heart-shaped groove.

One side of the slider defines a positioning pillar. A positioning post formed in the insulating housing cooperates with the positioning pillar to position the spring. The back end of the other side of the slider defines a pressing portion that presses against a part of one end of the card when inserting or ejecting the card. On the other hand, when the card is not in the connector, the pressing portion leans against a stopper of the insulating housing. It is proved that when the spring is compressed 2 mm, it will create a resilient force of 140–160 g. When the connector is assembled, the spring is compressed and disposed between the back wall of the insulating housing and the slider; therefore the spring creates a resilient force and imposes it upon the slider. The pressing portion of the slider just leans against the stopper, but there's no interference fit there-between, so the middle of the spring is easy to bounce upwards and drives the slider to fly out of the insulating housing, as a result, the ejecting mechanism is not convenient to assemble.

SUMMARY OF THE INVENTION

Accordingly, an object of the present invention is to provide a card connector which is convenient to assemble. The card connector includes: an insulating housing having a base, a back wall extending upward form a rear end of the base, and at least one stopper extending upward from a front portion of the base; a plurality of terminals disposed on the base; a shield covering the insulating housing to define a card receiving space for receiving a card; and an ejecting mechanism being slidable in the card receiving space for inserting/ejecting the card. The ejecting mechanism includes a slider and a compressed spring disposed between the back wall and the slider for pushing the slider to slide. The slider slides between a first position and a second position where the slider leans against the stopper. The stopper defines a recess, and the slider forms a receiving board projecting forward from one side which leans against the stopper. The receiving board wedges in the recess when the slider slides to the second position.

In assembling the ejecting mechanism with the insulating housing, the receiving board of the slider wedges in the recess of the stopper, so the slider is restricted from coming off the insulating housing. With such supporting structure, the card connector is convenient to assemble.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
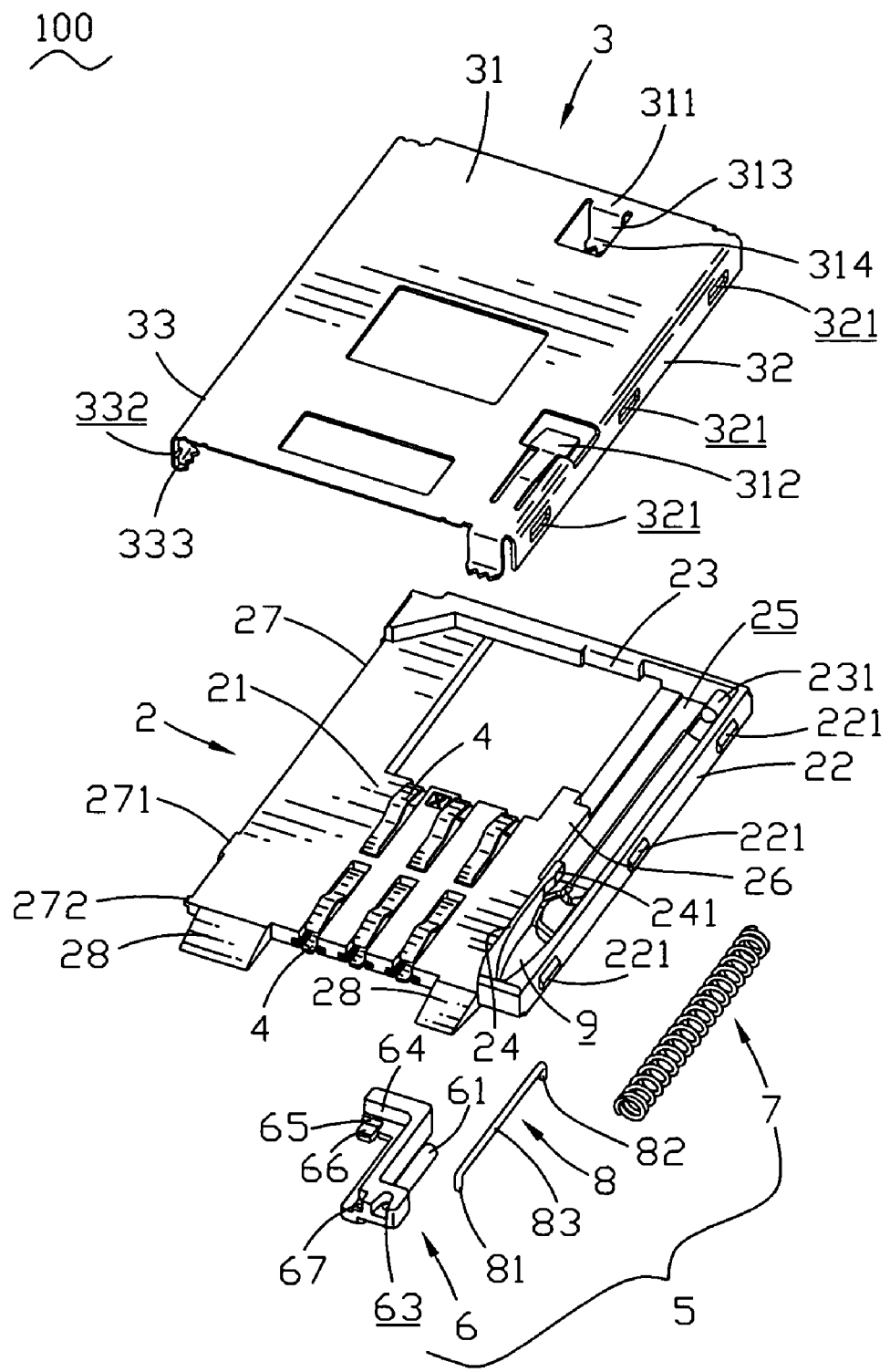
FIG. 1 is an exploded view of a card connector according to the present invention.
Figure 2:
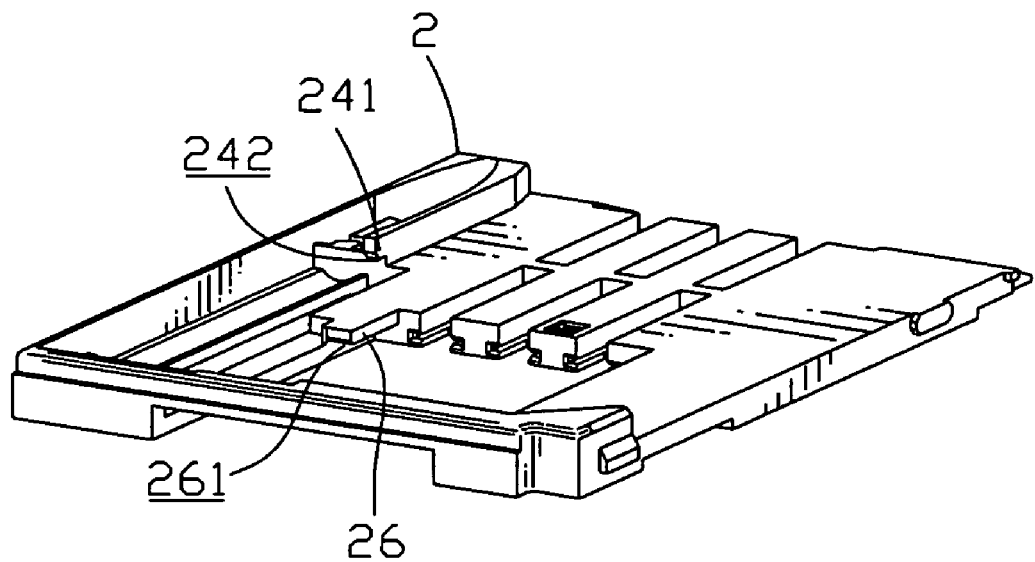
FIG. 2 is a perspective view of an insulating housing of the card connector.
Figure 3:
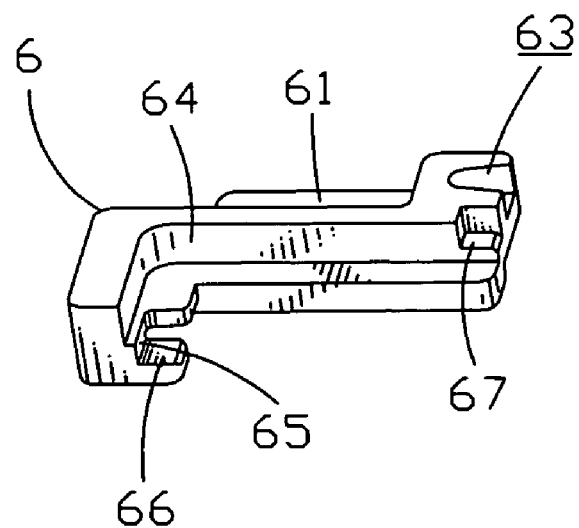
FIG. 3 is a perspective view of a slider of the card connector.
Figure 7:
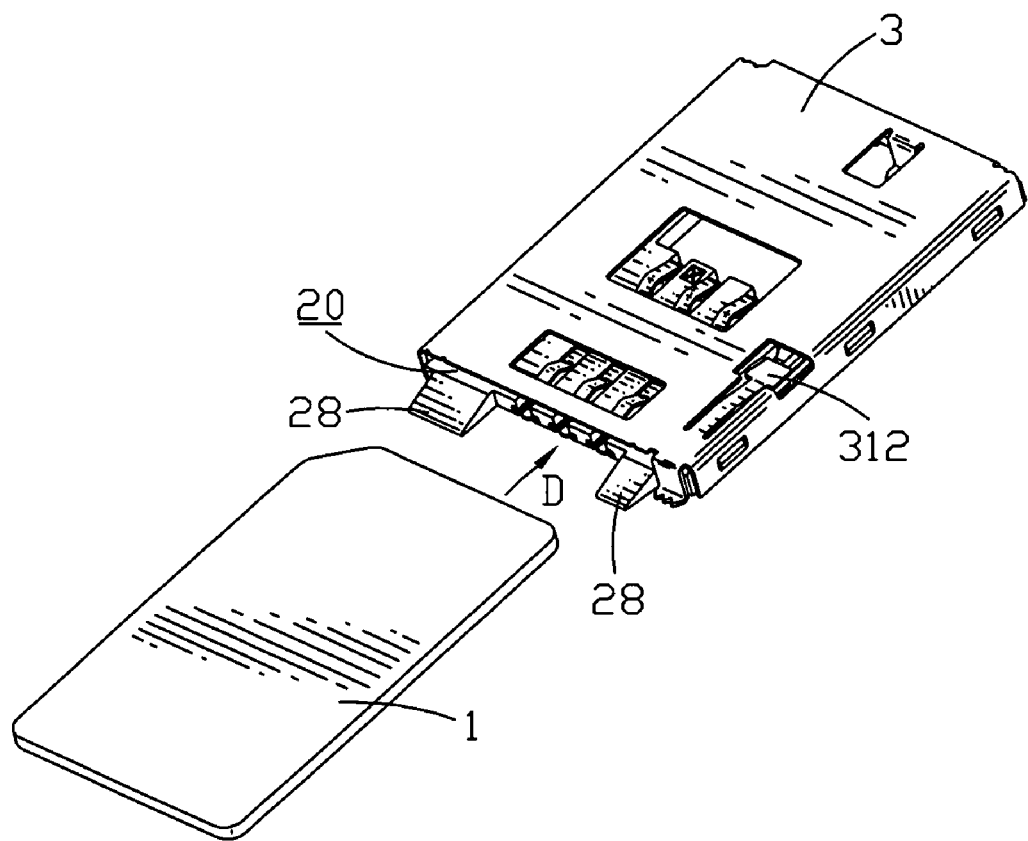
FIG. 7 is a perspective view of the card connector, also showing a card about to be inserted in the card connector.

Please refer to FIGS. 1–3. A card connector 100 comprises an insulating housing 2, a shield 3, a plurality of terminals 4 and an ejecting mechanism 5. As shown in FIG. 7, a card receiving space 20 is formed between the insulating housing 2 and the shield 3 for receiving a card 1.

The insulating housing 2 includes a base 21 and a back wall 23 extending upward from a rear end of the base 21. A plurality of terminals 4 is disposed on the base 21. The base 21 has a first and an opposite second sides 22, 27. A partition wall 24 is formed in the insulating housing 2 adjacent and parallel to the first side 22. The end of the partition wall 24 defines a first stopper 241. The bottom of the first stopper 241 defines a first recess 242. A heart-shaped groove 9 is formed between the partition wall 24 and the first side 22. A heart-shaped cam 91 is formed in the heart-shaped groove 9 and has a locking portion 911 (shown in FIG. 9). A second stopper 26 extends upward from a front portion of the base 21, and a lower portion of the second stopper 26 defines a second recess 261. A receiving groove 25 is defined between the back end of the heart-shaped groove 9, the second stopper 26, the back wall 23, and the first side 22. A positioning post 231 is formed on the back wall 23 and extends into the receiving groove. A plurality of latches 221, 271 is arranged on the out surfaces of the first and the second sides 22, 27. A protuberance 272 is arranged on the front end of the second side 27. Each of two sides of the front end of the insulating housing 2 extends forward and forms an oblique board 28 for guiding the insertion of the card 1.

The shield 3 includes a top plate 31, and two opposite sides of the top plate 31 extend downward and define a first side plate 32 and a second plate 33 respectively. The back of the top plate 31 defines a downward blocking piece 311. The blocking piece 311 further comprises a plane piece 313 vertical to the top plate 31 and a jagged piece 314 vertical to the plane piece 313. At the end of the ejecting operation, a part of one end of the card 1 presses against the plane piece 313 to avoid the insulating housing 2 coming off the shield 3. The front of the top plate 31 in accordance with the heart-shaped groove 9 defines an elastic pressing piece 312. A plurality of locking holes 321, 331 is disposed in the first side plate 32 and the second side plate 33 for respectively engaging with the latches 221, 271. A nick 332 is disposed in the front end of the second side plate 33 for engaging with the protuberance 272 of the insulating housing 2. One part of the end of the second side plate 33 below the nick 332 extends horizontally and defines a supporting plate 333 for supporting the insulating housing 2.

As shown in FIG. 1, the ejecting mechanism 5 comprises a slider 6, a compressed spring 7, a cam lever 8, and the heart-shaped groove 9 defined in the base 21 of the insulating housing 2. The slider 6 is slidably arranged in the receiving groove 25. The front end of one side of the slider 6 is depressed and defines a connecting hole 63 therein, and the back end defines a positioning pillar 61 according to the positioning post 231. Two opposite ends of the compressed spring 7 are disposed on the positioning post 231 and the positioning pillar respectively. Beside the connecting hole 63, the slider 6 forms a first receiving board 67 for engaging with the first stopper 241 of the partition wall 24 (shown in FIGS. 3–4). The back end of the other side of the slider 6 defines a propping portion 64 that props against a part of one end of the card 1 when inserting or ejecting the card 1. The bottom of the propping portion 64 forms a blocking portion 65 for leaning against the second stopper 26 of the insulating housing 2 when the card 1 is not loaded in the connector 100. The bottom of the blocking portion 65 extends forward and forms a second receiving board 66 to engage with the second recess 261. The cam lever 8 includes a moving portion 81 formed at one end of the cam lever 8 movably arranged in the heart-shaped groove 9 and moving along the heart-shaped groove 9, a connecting portion 82 formed at the other end of the cam lever 8 pivotally connected to the connecting hole 63 of the slider 6, and a middle portion 83 connecting the moving portion 81 and the connecting portion 82.

Figure 4:
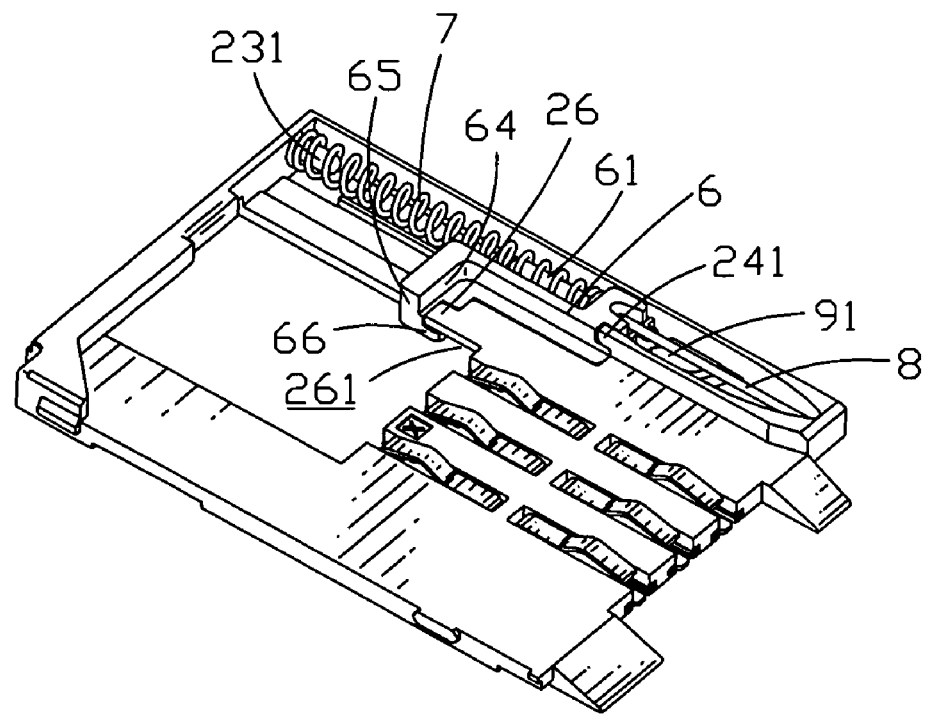
FIG. 4 is a perspective view of the card connector with a shield of the card connector removed.
Figure 5:
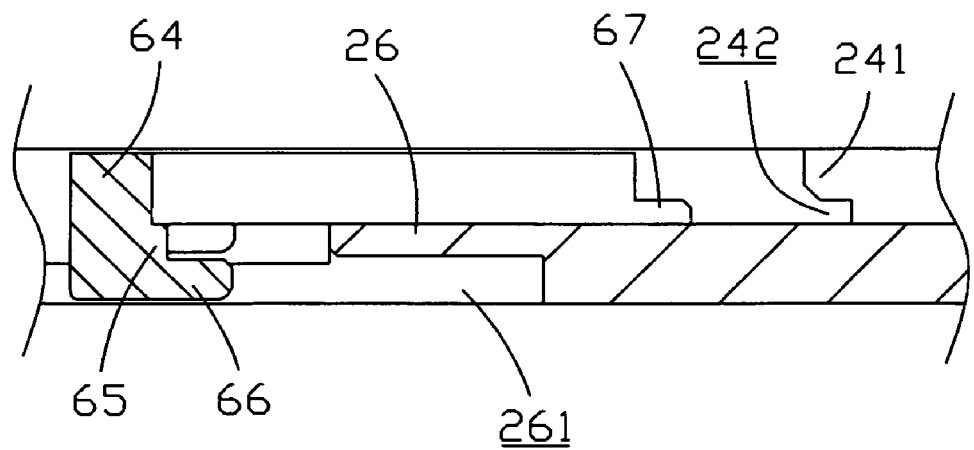
FIG. 5 is a partial cross-sectional view of the card connector showing the slider sliding to a first position.
Figure 6:
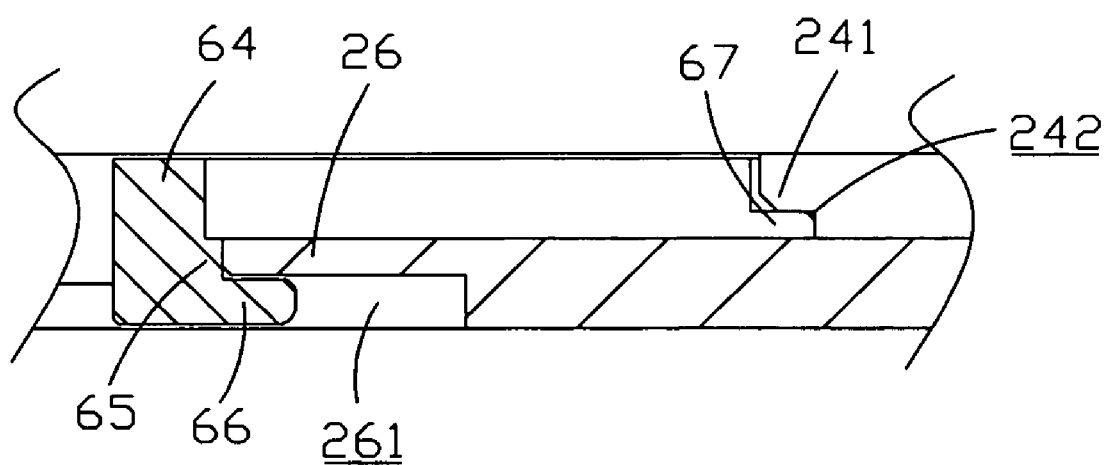
FIG. 6 is a partial cross-sectional view of the card connector showing the slider sliding to a second position.

Please refer to FIGS. 4–9, when the card 1 is not inserted into the connector 100, the blocking portion 65 of the slider 6 leans against the second stopper 26 of the insulating housing 2, and the first and second receiving boards 66, 67 wedge in the first and second recesses 242, 261 respectively. The slider 6 is put in a position designated as a second position as shown in FIGS. 4 and 6. When the card 1 is being inserted into the connector 100, a part of one end of the card 1 props against the propping portion 64 of the slider 6 and drives the slider 6 to slide backwards to a first position as shown in FIG. 5.

Please refer to FIGS. 4–6. When the ejecting mechanism 5 is assembled, firstly, the compressed spring 7 is compressively disposed between the positioning pillar 61 and the positioning post 231. Secondly, the slider 6 is disposed on the second position where the blocking portion 65 of the slider 6 leans against the second stopper 26, the second receiving board 66 wedges in the second recess 261 of the second stopper 26, and the first receiving board 67 wedges in the first recess 242 of the first stopper 241, and therefore the back end of the slider 6 is hard to disengage from the receiving groove 25 and stably disposed in the insulating housing 2. Finally, the moving portion 81 of the cam lever 8 is movably arranged in the heart-shaped groove 9 while the connecting portion 82 of the cam lever 8 is connected to the connecting hole 63 of the slider 6. The slider 6 is stably disposed in the insulating housing 2 and restrains the spring 7 of which one end is locked on the positioning pillar 61 of the slider 6 from bouncing upwards and, as a result, the ejecting mechanism 5 is conveniently and stably assembled in the card connector 100.

Figure 8:
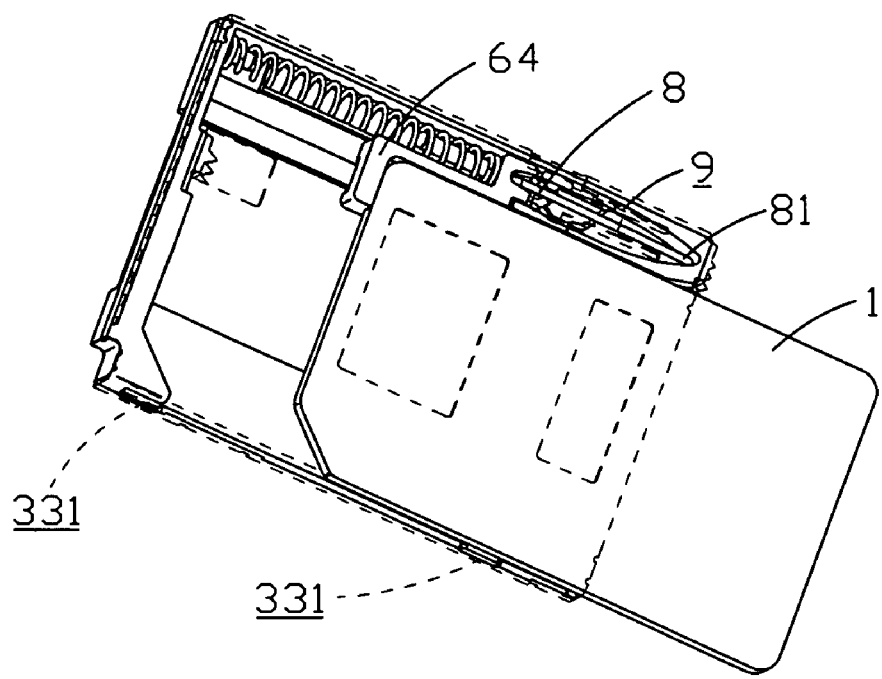
FIG. 8 is a perspective view of the card connector with the shield shown in dotted line, illustrating the card partially inserted in the card connector and pushing the slider to slide.
Figure 9:
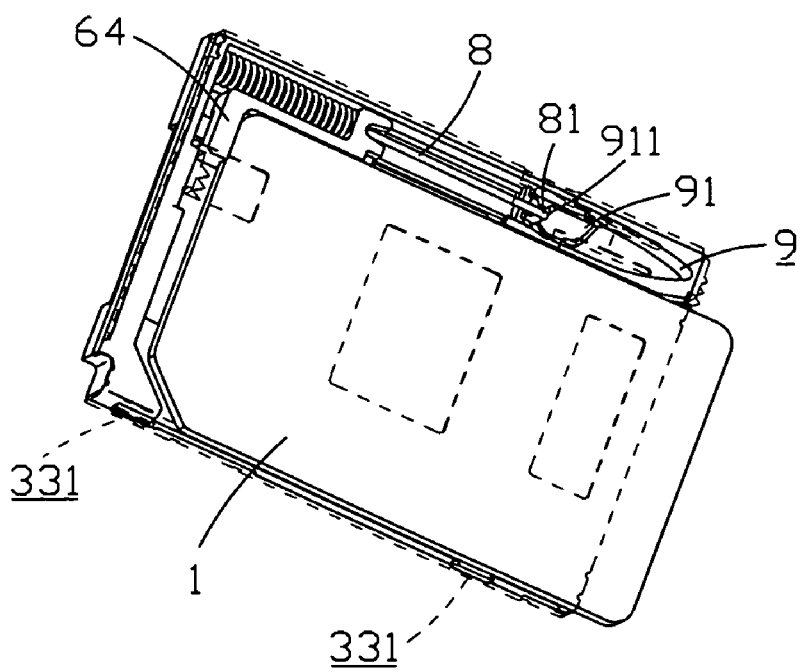
FIG. 9 is a perspective view of the card connector with the shield shown in dotted line, illustrating the card fully inserted in the card connector.

Please refer to FIGS. 7–9. When the card 1 is inserted into the card connector 100 from the front of the card receiving space 20, a part of one end of the card 1 leans against the propping portion 64 of the slider 6 and drives the slider 6 to slide backwards, and therefore the spring 7 is compressed and the cam lever 8 is driven to move backwards along the heart-shaped groove 9 until the moving portion 81 of the cam lever 8 is locked by the locking portion 911 of the heart-shaped cam 91. Then the ejecting mechanism 5 reaches a stay state and the card 1 is held in the card receiving space 20 of the connector 100. If the card 1 is pushed again in the forward inserting direction D to the first position, the moving portion 81 of the cam lever 8 is unlocked, and the card 1 is ejected by the resilience force of the compressed spring 7.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A card connector comprising:
    an insulating housing having a base, a back wall extending upward from a rear end of the base, the base having a first side and an opposite second side;
    a partition wall formed above a front portion of the base and parallel to the first side, the partition wall having a first stopper defined at a rear end and a first recess formed below the first stopper above the base;
    a second stopper formed on the base and a second recess formed below the second stopper in a lower portion of the base;
    a receiving groove defined between the back wall the second stopper, and the first side;
    a plurality of terminals disposed on the base;
    a shield covering the insulating housing to define a card receiving space for receiving a card; and
    an ejecting mechanism being slidable in the receiving groove for inserting/ejecting the card, the ejecting mechanism comprising a slider and a compressed spring disposed between the back wall and the slider for pushing the slider to slide between a first position and a second position, the slider being formed with a first receiving board and a blocking portion with a second receiving board extending out;

wherein the first and second receiving boards respectively wedge in the first and second recesses when the slider slides to the second position with the blocking portion blocked by the second stopper, thereby preventing the slider from coming off.

2. The card connector as claimed in claim 1, wherein two opposite sides of a front end of the base of the insulating housing extend forward and form a pair of oblique boards for guiding the insertion of the card.

3. The card connector as claimed in claim 1, wherein the back wall of the insulating housing provides a positioning post extending forward, the slider provides a positioning pillar extending rearward, two opposite ends of the compression spring are disposed on the positioning post and the positioning pillar respectively.

4. The card connector as claimed in claim 1, wherein a heart-shaped groove is formed between the partition wall and the first side of the base, the ejecting mechanism further comprises a cam lever, one end of the cam lever pivotally connects to the slider, and the other end of the cam lever slides along the heart-shaped groove for restricting the sliding movement and stopping of the slider.

5. The card connector as claimed in claim 1, wherein the shield includes a top plate which defines a downward blocking piece for blocking one end of the card to prevent the insulating housing from coming off the shield in an insertion/ejection operation.

6. The card connector as claimed in claim 4, wherein the shield stampingly forms an elastic pressing piece pressing on the cam lever to urge the cam lever to engage with the heart-shaped groove.

* * * * *